United States Patent
Rivera et al.

(10) Patent No.: US 10,787,201 B1
(45) Date of Patent: Sep. 29, 2020

(54) VEHICLE BONNET CONSTRUCTIONS FOR REDUCING IMPACT FORCES

(71) Applicant: Waymo LLC, Mountain View, CA (US)

(72) Inventors: Felix Jose Alvarez Rivera, Tarzana, CA (US); Daniel Lynn Larner, San Jose, CA (US); Atul Gupta, San Jose, CA (US); Thomas Daniel, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/705,708

(22) Filed: Sep. 15, 2017

Related U.S. Application Data (63) Continuation of application No. 14/968,197, filed on Dec. 14, 2015, now Pat. No. 9,783,236.

(51) Int. Cl.
*B62D 25/10* (2006.01)
*B62D 25/12* (2006.01)
*B62D 21/15* (2006.01)

(52) U.S. Cl.
CPC ............ *B62D 21/152* (2013.01); *B62D 25/10* (2013.01); *B62D 25/12* (2013.01)

(58) Field of Classification Search
CPC .............. B60R 21/34; B60R 2021/343; B60R 2021/346; B62D 25/10; B62D 25/12; B62D 29/001; B62D 29/002; B62D 29/004; B62D 29/005; B62D 29/043
USPC ............................ 296/187.09, 187.04, 193.11
See application file for complete search history.

(56) References Cited

U.S. PATENT DOCUMENTS

| | | | |
|---|---|---|---|
| 3,933,387 A * | 1/1976 | Salloum | B60R 19/18 293/120 |
| 6,824,202 B2 | 11/2004 | Vismara et al. | |
| 6,863,339 B2 | 3/2005 | Bohm et al. | |
| 7,090,289 B2 | 8/2006 | Koura | |
| 7,150,496 B2 | 12/2006 | Fujimoto | |
| 7,238,407 B2 | 7/2007 | Wesch et al. | |
| 7,377,580 B1 * | 5/2008 | Ekladyous | B62D 25/105 180/69.21 |
| 7,488,031 B2 | 2/2009 | Ishitobi | |
| 7,690,720 B2 * | 4/2010 | Wang | B62D 25/12 180/69.2 |
| 7,810,877 B2 | 10/2010 | Ishitobi | |
| 7,988,222 B2 | 8/2011 | Fujimoto | |
| 7,997,642 B2 | 8/2011 | Rocheblave et al. | |
| 8,052,198 B2 | 11/2011 | Seksaria et al. | |

(Continued)

OTHER PUBLICATIONS

Part BOX Performance and Tuning Parts, "Performance Friction Ford Focus RS Mk1 Bremsbelage vome (S-Rated)", <http://www.partbox.com/product_info.php?products_id=19501>, 3 pages, Printed date: Sep. 9, 2015.

*Primary Examiner* — Gregory A Blankenship
(74) *Attorney, Agent, or Firm* — Botos Churchill IP Law (57) ABSTRACT

The technology relates to vehicle panels. The vehicle panel may comprise a top layer and a bottom layer. The top and bottom layers may be bonded together. The bond of the top and bottom layer may be a weld. One or more energy absorbing layers may be positioned between the top layer and the bottom layer. The one or more energy absorbing layers may be comprised of one or more energy absorbing materials. The energy absorbing layers may be aluminum honeycomb and polyurethane foam.

15 Claims, 7 Drawing Sheets

(56) References Cited

U.S. PATENT DOCUMENTS

| | | | |
|---|---|---|---|
| 8,276,975 B2 * | 10/2012 | Kimoto | B32B 5/12 |
| | | | 296/181.2 |
| 8,356,857 B2 * | 1/2013 | Ralston | B60R 21/34 |
| | | | 296/187.04 |
| 8,434,815 B2 | 5/2013 | Yoshida et al. | |
| 8,485,588 B1 | 7/2013 | Voss et al. | |
| 8,544,585 B2 | 10/2013 | Ballard | |
| 8,714,631 B2 | 5/2014 | Takahashi | |
| 8,991,902 B2 | 3/2015 | Wisniewski et al. | |
| 8,991,908 B2 | 3/2015 | Ikeda et al. | |
| 9,022,161 B2 | 5/2015 | Kaisare et al. | |
| 9,381,879 B2 * | 7/2016 | Mankame | B62D 25/105 |
| 9,688,313 B2 * | 6/2017 | Chikada | B62D 25/105 |
| 9,701,274 B2 * | 7/2017 | Mildner | B60R 21/34 |
| 9,709,120 B1 * | 7/2017 | Waskie | F16F 7/12 |
| 9,783,236 B1 * | 10/2017 | Rivera | B62D 21/152 |
| 9,868,472 B2 * | 1/2018 | Takada | B60R 21/34 |
| 9,914,485 B2 * | 3/2018 | Hammer | B62D 25/12 |
| 9,950,744 B2 * | 4/2018 | Hammer | B62D 25/105 |
| 2003/0214151 A1 | 11/2003 | Vismara et al. | |
| 2004/0262952 A1 | 12/2004 | Kempf et al. | |
| 2005/0142333 A1 * | 6/2005 | Montagna | B29C 43/146 |
| | | | 428/180 |
| 2006/0028051 A1 | 2/2006 | Brei et al. | |
| 2006/0163915 A1 | 7/2006 | Ikeda et al. | |
| 2009/0026807 A1 | 1/2009 | Wang et al. | |
| 2012/0055094 A1 | 3/2012 | Iacovoni et al. | |
| 2014/0302279 A1 | 10/2014 | Pfaffelhuber et al. | |
| 2015/0291123 A1 | 10/2015 | Yoshida et al. | |
| 2017/0158163 A1 * | 6/2017 | Yoshida | B60R 21/34 |
| 2017/0188650 A1 * | 7/2017 | Hector, Jr. | B32B 18/00 |
| 2018/0170436 A1 * | 6/2018 | Yoshida | B62D 25/105 |

\* cited by examiner

VEHICLE BONNET CONSTRUCTIONS FOR REDUCING IMPACT FORCES

CROSS-REFERENCE TO RELATED APPLICATIONS

The present application is a continuation of U.S. patent application Ser. No. 14/968,197, filed on Dec. 14, 2015, the disclosure of which is incorporated herein by reference.

BACKGROUND

Vehicles, such as automobiles and motorcycles, are covered by vehicle panels. The vehicle panels, such as hoods, fenders, and bumpers, may provide performance and safety improvements to the vehicles. As such, improvements in the performance and safety offered by the vehicle panels may be desired.

SUMMARY

Embodiments within the disclosure relate generally to vehicle bonnet constructions for reducing impact forces. One aspect includes a vehicle panel comprising a top layer and a bottom layer, wherein the bottom layer is bonded to the top layer. The vehicle panel may further include one or more energy absorbing layers, wherein the one or more energy absorbing layers are comprised of one or more energy absorbing materials, and the one or more energy absorbing layers are positioned between the top layer and the bottom layer.

Another embodiment includes a vehicle panel comprising a top and bottom layer comprising steel, wherein the bottom layer is bonded to the top layer. The vehicle panel may further include one or more energy absorbing layers, wherein the one or more energy absorbing layers are comprised of one or more energy absorbing materials. The one or more energy absorbing materials may be comprised of polyurethane foam and be positioned between the top layer and the bottom layer.

Another embodiment includes a vehicle panel comprising top and bottom layer comprising steel. The top and bottom layer may be bonded together. The panel may also comprise a first energy absorbing layer, wherein the first energy absorbing layer is comprised of at least 20 mm thick polyurethane foam.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

The technology relates to constructing panels of vehicles with layers of energy absorbing materials to improve the performance and safety of the vehicles. A vehicle may include many external vehicle panels, such as bumpers, fenders, nose panels, door panels, etc. These vehicle panels may be formed by layering materials between two outer sheets. For example, a vehicle panel, such as the bonnet or hood panel, may be formed by bonding together two outer sheets of material, such as steel. In this instance, the outer sheets may include a top layer and bottom layer of the hood. In some embodiments, materials other than steel, such as carbon fiber, polycarbonate, aluminum, etc., may be used for forming the top and bottom layers. In further embodiments the top and bottom layers may be formed from any combination of materials. For example, the top panel may be comprised of polycarbonate and the bottom panel may be comprised of steel. In another example, both the top and bottom panels may be comprised of a combination of polycarbonate and steel.

The outer sheets may include one or more forms. In this regard, forms may be stamped, molded, glued, or otherwise attached to one or more of the outer sheets. The outer sheets may use forms to increase the x-sectional moment of inertia to add stiffness to the panel. For example, the bottom layer of a hood panel may be stamped to create multiple rows of cone forms. While not shown, the top layer of the vehicle panel may also include forms. In some embodiments, forms other than cone forms, such as square forms, rectangular forms, etc., may be used in place of, or in addition to the cone forms. In some embodiments the top or bottom layer of the hood may include no forms. The forms may also be coated with an adhesive to assist in bonding together layers of the hood, as further described below. The adhesive may be one or more types of adhesives such as a liquid adhesive, glue, putty, etc.

The size, number, and alignment of the cone forms may be dependent on the desired characteristics of the panels. In this regard, variations to the size, number, and alignment of the cone forms may adjust the weight, stiffness, and torsional rigidity of the sheets. For example, by altering the size, number, and alignment of the cone forms on the top or bottom layers, the vehicle panel may be made stiffer with an increased x-sectional moment of inertia, while nominally increasing the weight of the hood.

The outer sheets may be bonded together. In this regard, the outer sheets may be welded together to form top and bottom layers of a vehicle panel, such as a hood panel. In some embodiments clasps, clips, screws, or other such connectors may be used in place of, or in addition to welding the outer sheets together. The outer sheets of a vehicle panel may be further connected by the adhesives coated on the cone forms.

Energy absorbing layers may be enclosed between the outer sheets. For example, between the top and bottom layers of the vehicle panel, one or more layers of energy absorbing materials may be positioned to fill the cavity between the top and bottom layers. The energy absorbing layers may be sized and positioned to fill the interior of the vehicle panel in a layered arrangement. In some embodiments no energy absorbing layers may be used, or only a single energy absorbing layer may be used.

The energy absorbing layers may be made of lightweight and pliable materials. For example, friable foams, such as polyurethane foam may be used as an energy absorbing layer. In other embodiments, other materials, such as aluminum honeycomb, may be used to create the energy absorbing layers. In further embodiments, a combination of materials may be used to create the energy absorbing layers.

Variations to the arrangement of, and types of materials used for, the energy absorbing layers may be made to adjust the stiffness, torsional rigidity, and strength of vehicle panels. In this regard, the energy absorbing layers, such as, friable foams may be relatively stiff in static loading conditions, but soften during high energy impacts (e.g., a collision with the vehicle). Depending on the positioning and arrangement of the energy absorbing layers, an increase in the torsional rigidity and strength of the vehicle panel may occur.

Depending on the arrangement of the energy absorbing layers the gauge of the steel comprising the outer sheets of the vehicle panel may be increased, as substituting the empty space between the top and bottom layers with energy absorbing layers provides the vehicle panel with enough stiffness. Thus, the strength provided by the use of lower gauged steel may become more than needed. As such, a higher gauged (i.e., thinner) material may be used to create the top and bottom layers of the hood while maintaining the strength of the vehicle panel. In some embodiments, the increase in the gauge of the material may result in weight savings of about 30%, or more or less, while still achieving the stiffness necessary for the panels to be used on a vehicle. The reduced weight may increase vehicle fuel efficiency of the vehicle.

The features of the vehicle panels described above may reduce the risk of injury or damage to persons or objects which may collide with the vehicle. In this regard, the energy absorption capabilities of the energy absorbing layers can potentially reduce injury or damage by absorbing more energy than a conventional panel. For example, configurations of a hood panel shown may result in a 24% reduction in head injury criterion measurements, such as the HIC15, over a baseline configuration, while still being 42% stiffer. This reduction in the HIC15 measurements may be further be tuned by using different material combinations for the outer sheets and the energy absorbing layers to achieve lower weight, while still maintaining relative stiffness to the baseline.

Additionally, the cost and complexity in manufacturing the panels may be reduced, as the use of energy absorbing layers may remove the need for additional materials to strengthen the torsional rigidity of the vehicle panels. In this regard, conventional panels may include additional forms welded or attached onto the panels for the purpose of strengthening the vehicle panels. These additional forms may require complex tooling, high amounts of laser weld areas, and more use of heavy materials, such as steel, etc. By strengthening the torsional rigidity of the panels with cheaper and lighter energy absorbing layers, the panels may not need the additional forms, thereby removing many of the complex and costly manufacturing requirements of conventional vehicle panels such as hood panels.

Example Systems

Figure 1:
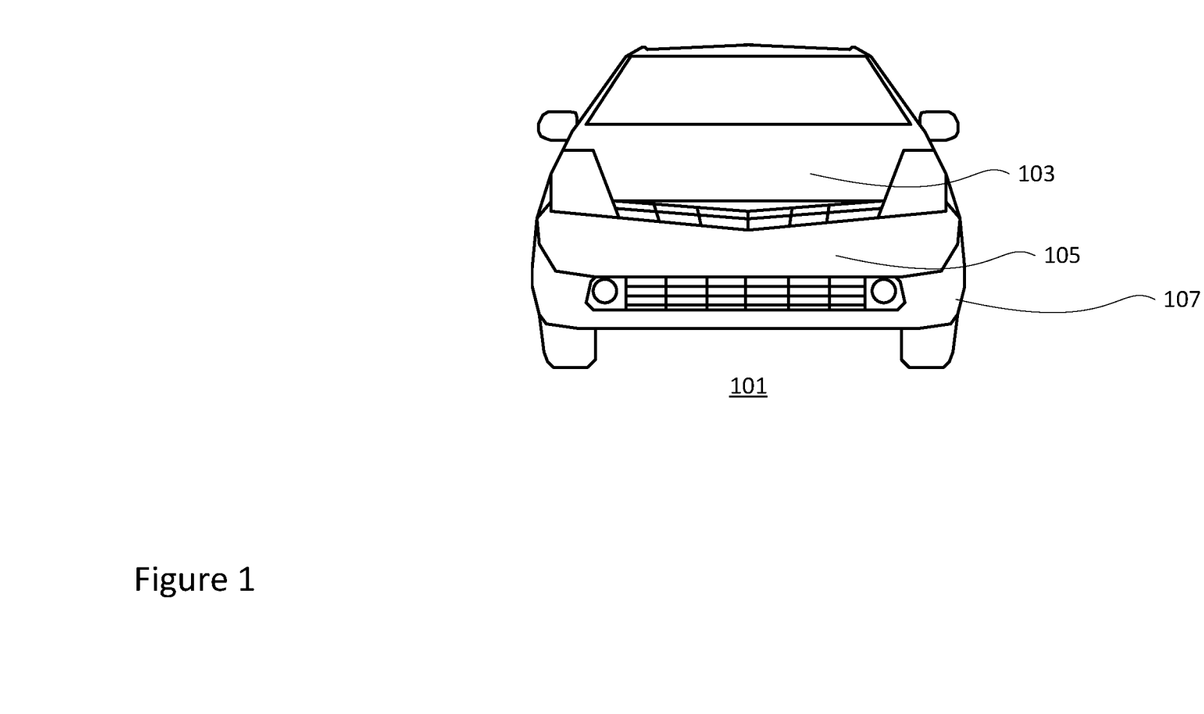
FIG. 1 is an exterior of a vehicle in accordance with an exemplary embodiment.

A vehicle may include one or more external vehicle panels. For example, as shown in FIG. 1, a vehicle 101 may include vehicle panels such as a bonnet or hood panel 103, lower panel 105, bumper panel 107, etc. Such vehicle panels may be designed to absorb impact energy during collisions, while providing the necessary stiffness to maintain shape while the vehicle is in motion, as further described herein.

Figure 2:
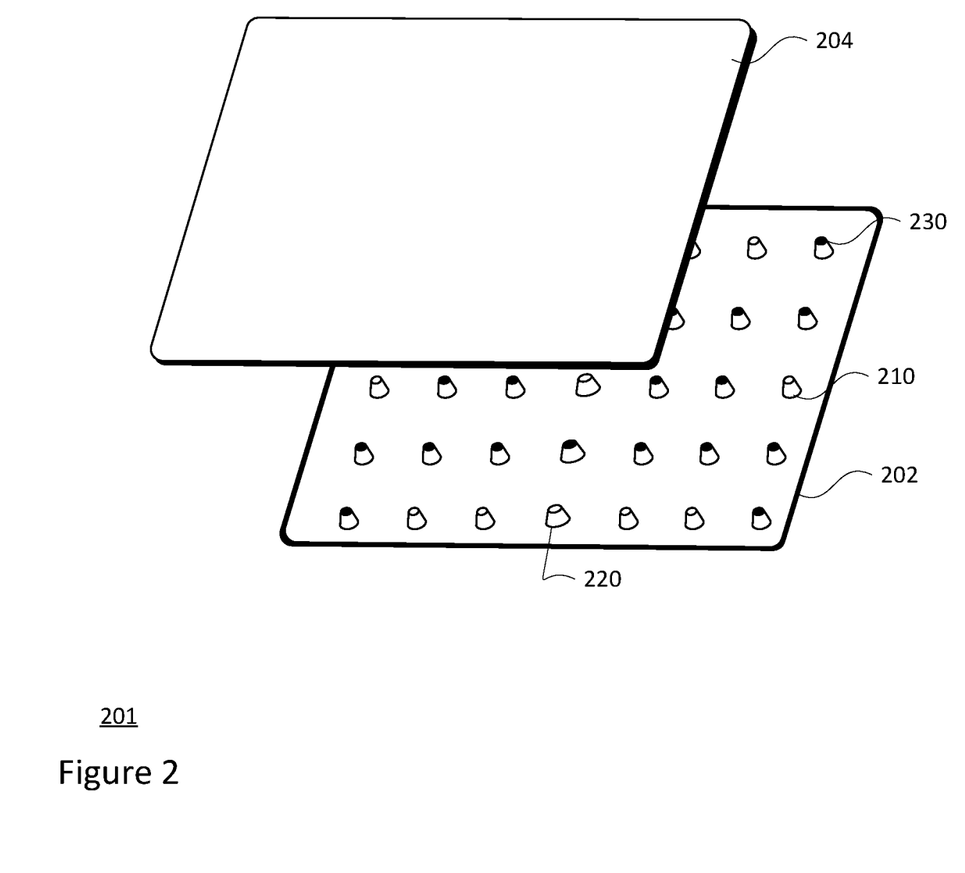
FIG. 2 is an image of a panel in accordance with aspects of the disclosure.

The vehicle panels may be formed by layering materials between two outer sheets. For example, as shown in FIG. 2, a vehicle panel, such as baseline hood panel 201 may be formed by bonding together two outer sheets of material. This baseline hood panel 201 may be used for hood panel 103, for instance. The outer sheets may include a top layer 204 and bottom layer 202 comprised of a material, such as steel. The top layer 204 may have a thickness of about 0.6 mm, or more or less, and the bottom layer 202 may have a thickness of about 0.5 mm, or more or less. In some embodiments, materials other than steel, such as carbon fiber, aluminum, plastic, etc., may be used for forming the top 204 or bottom 202 layers.

The outer sheets may include one or more forms. In this regard, forms may be stamped, molded, glued, or otherwise attached to one or more of the outer sheets. For example, as further shown in FIG. 2, the bottom layer 202 of the baseline hood panel 201 may be stamped to create multiple rows of cone forms 210. While not shown, the top layer 204 of the baseline hood panel 201 may also include forms. In other embodiments the top or bottom layer of the vehicle panels may include no forms. The cone forms may be of differing sizes as shown by cone forms 210 and 220 on the bottom layer 202 of the baseline vehicle panel 201. The forms may also be coated with an adhesive 230 to assist in bonding together layers of the hood panel, as further described below. The adhesive may be one or more types of adhesives such as a liquid adhesive, glue, putty, etc.

The size, number, and alignment of the cone forms may be dependent on the desired characteristics of the panels. In this regard, variations to the size, number, and alignment of the cone forms may adjust the weight and increase or decrease the x-sectional moment of inertia to add or remove stiffness to the vehicle panel, respectively. For example, by stamping the cone forms as illustrated on the bottom layer 202 of baseline vehicle panel 201, the panel may be made stiffer with an increased x-sectional moment of inertia, while nominally increasing the weight of the hood panel. As such, the weight of the baseline hood panel 201 may be around 15.65 kg, or more or less, with the inclusion of the cone forms 210 and 220. In some embodiments, forms other than cone forms, such as square forms, rectangular forms, etc., may be used in place of, or in addition to the cone forms. In other embodiments, the outer sheets may include one or more cutouts. Variations to the arrangements and types of forms and cutouts used may result in different structural stiffness and torsional rigidity of the vehicle panel.

Figure 3:
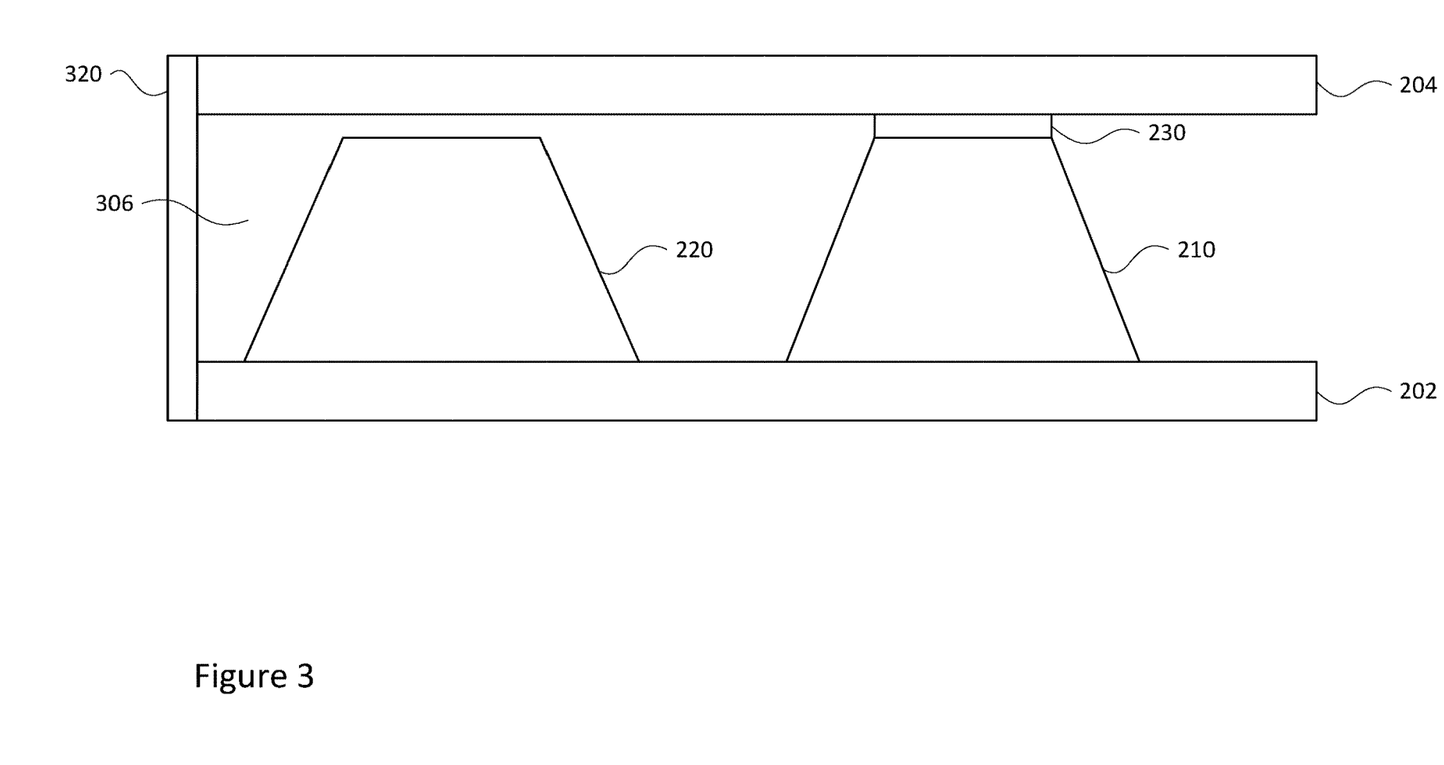
FIG. 3 is a cross-sectional image of a panel in accordance with aspects of the disclosure.

The outer sheets may be bonded together. For example, as shown in FIG. 3, the top layer 204 and bottom layer 202, may be bonded together around the entire exterior of the baseline vehicle panel 201 as shown by weld 320. In some embodiments clasps, clips, screws, adhesives, or other such connectors may be used in place of, or in addition to welding the outer sheets together.

The outer sheets of a vehicle panel may be further connected by adhesives. As further shown in FIG. 3, the cone form 210, which was stamped into bottom layer 202, may be coated with adhesive 230. The adhesive 230 may then bond with the top layer 204, resulting in the top layer 204 being directly bonded with an adhesive to the bottom layer 202. Cone form 220 may have no adhesive coating, and as such does not bond the top layer 204. Further, as shown in area 306, a cavity may be present between the top and bottom layers when they are bonded together.

Figure 4:
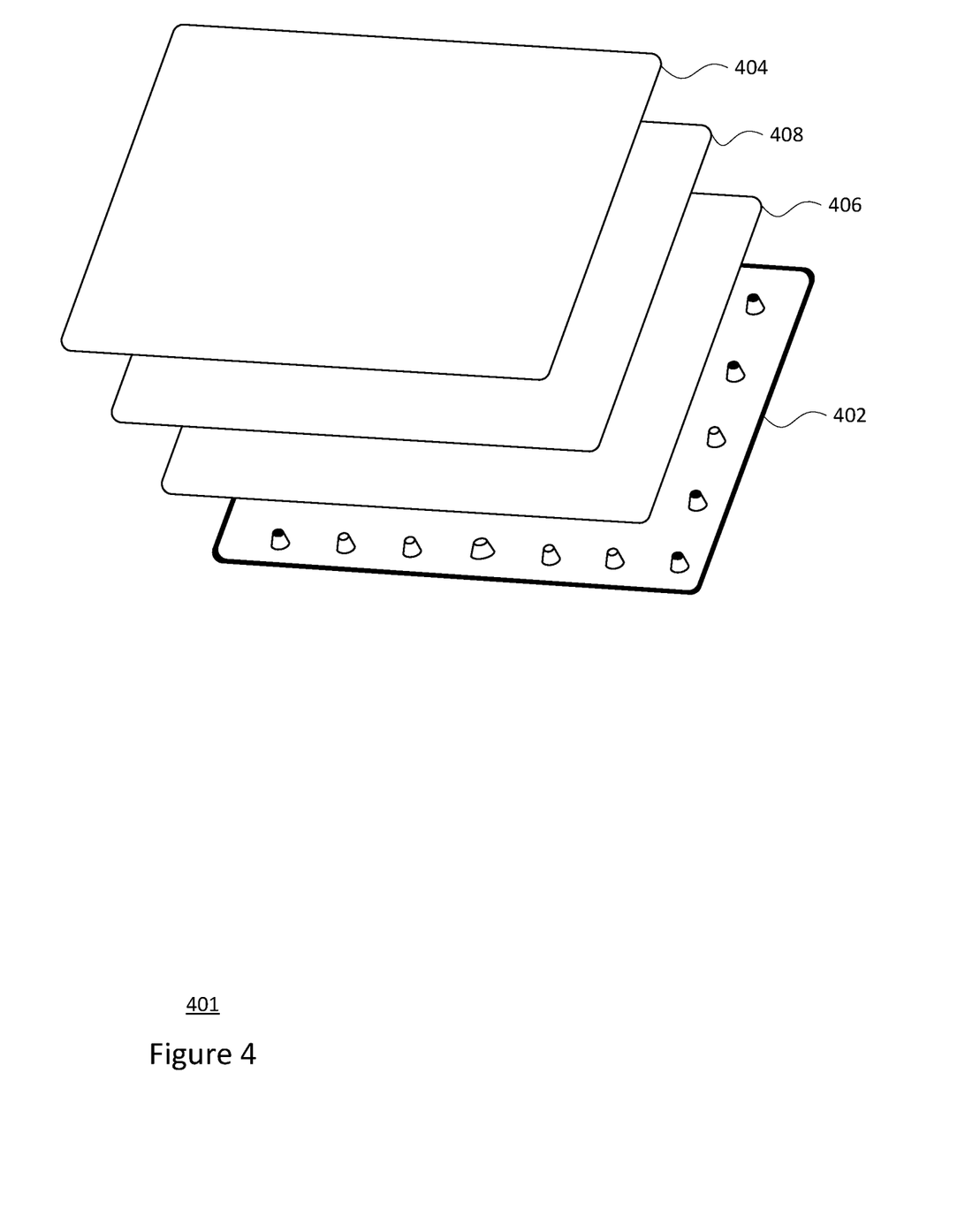
FIG. 4 is an image of a panel in accordance with aspects of the disclosure.

Energy absorbing layers may be enclosed between the outer sheets. For example, as shown in FIG. 4, between the top layer 404 and bottom layer 402, which may be the same or different from top layer 204 and bottom layer 202, of vehicle panel 401, one or more layers of energy absorbing materials 406 and 408 may be sized and positioned to fill the interior of the vehicle panel 401 in a layered arrangement. As such, the energy absorbing materials may fill any cavities between the top and bottom layers. In some embodiments no energy absorbing layers may be used (e.g., as shown in the baseline vehicle panel 201 in FIG. 2), or only a single energy absorbing layer may be used.

The energy absorbing layers may be made of lightweight and pliable materials. For example, friable foams, such as polyurethane foam may be used as an energy absorbing layer. In other embodiments, other materials, such as aluminum honeycomb, may be used to create the energy absorbing layers.

In some embodiments the panel may be pressurized. For example, turning back to FIG. 3, the cavity 306 may be injected with a fluid or gas to raise the internal pressure of the panel compared to the pressure external to the panel. For example, the cavity 306 may be pressurized by injecting a fluid and/or gas through a valve (not shown) on the top or bottom layer. In some embodiments a small compressed gas storage tank may be used to inject the gas through the valve. In other embodiments the cavity 306 may be pressurized as the result of a chemical reaction occurring within the cavity. In this regard, a chemical reaction may be triggered within the cavity 306 through the use of an electric switch positioned in the cavity, which may ignite a propellant, such as compressed nitrogen or argon gas. The pressure increase within the panel may increase the stiffness of the panel, while adding minimal weight.

A valve or flap may be placed on the panel to allow the gas to vent. During an impact the panel may release the gas through the flap, thereby decreasing the pressure within the panel. As the pressure decreases the stiffness of the hood decreases and the energy absorbing capabilities of the panel may increase.

Figure 5A:
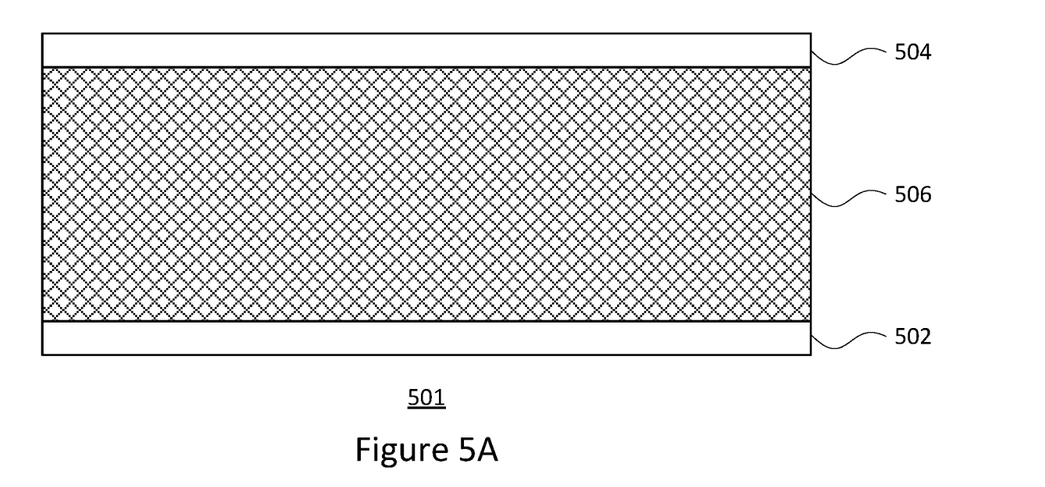
FIGS. 5A and 5B are cross-sectional images of panels in accordance with aspects of the disclosure.
Figure 5B:
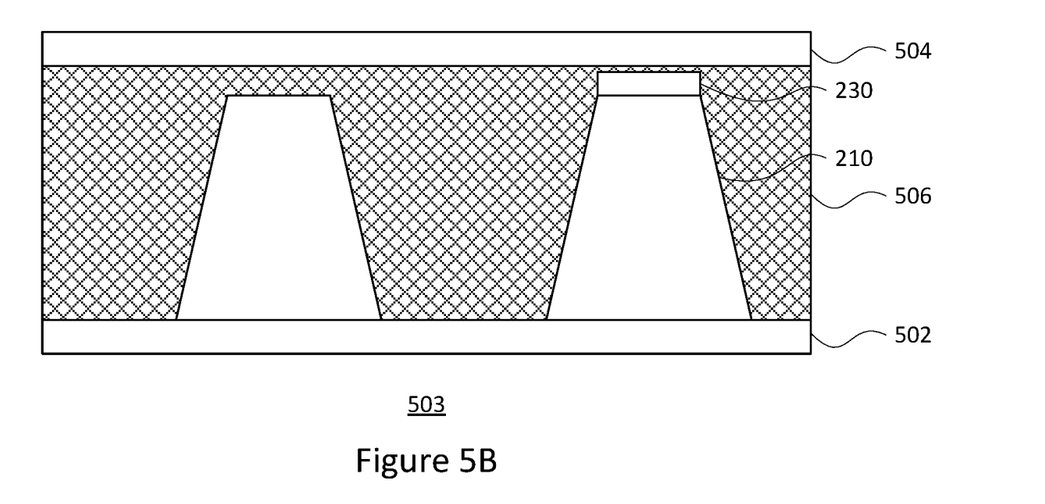

FIGS. 5A and 5B show an example of a single energy absorbing layer 506 being positioned between the outer sheets of vehicle panels. Turning first to FIG. 5A, energy absorbing layer 506, comprised of polyurethane foam which is around 20.55 mm thick, may be positioned between a top layer 504 and bottom layer 502 of vehicle panel 501. The top layer 504 and bottom layer 502 of may be comprised of steel with a thickness of about 0.35 mm. In some embodiments, other outer sheets may be used, such as bottom layers 202 or 402 and top layers 204 and 404. In other embodiments, no forms or cutouts may be present on the top and/or bottom layers. The entire weight of vehicle panel 501 may be about 10.92 kg.

Turning now to FIG. 5B, energy absorbing layer 506, comprised of polyurethane foam which is about 20.55 mm thick, may be positioned between a top layer 504 and bottom layer 502 of vehicle panel 503. The top layer 504 and bottom layer 502 of may be comprised of steel with a thickness of around 0.35 mm. Cone forms 210 and adhesives 230 may present on the bottom layer 502. With the inclusion of the cone forms 210, the weight of the vehicle panel 503 may be about 11.03 kg. In some embodiments, other outer sheets may be used, such as bottom layers 202 or 402 and top layers 204 and 404. In other embodiments, no cone forms or cutouts may be present.

Figure 6A:
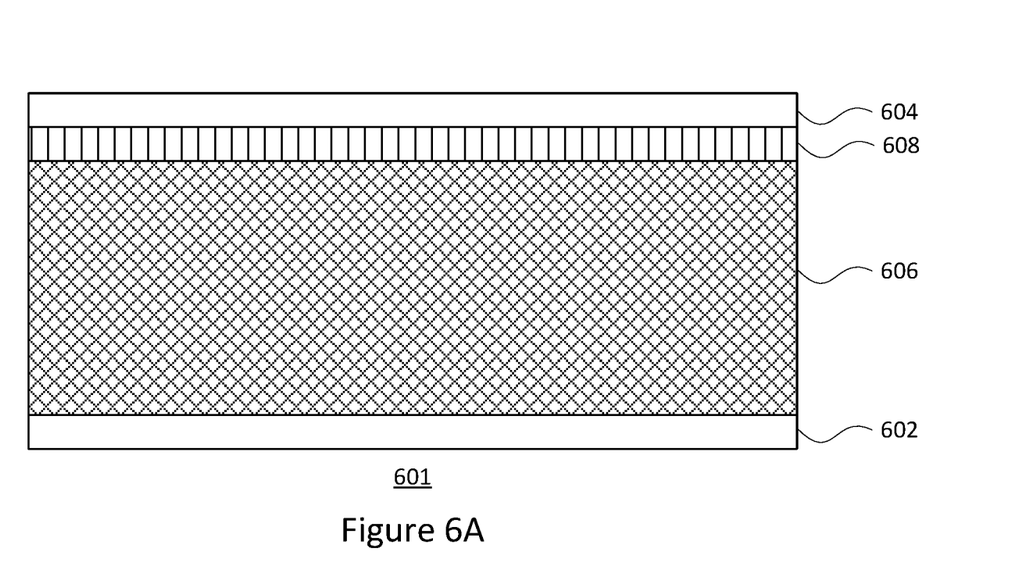
FIGS. 6A and 6B are cross-sectional images of panels in accordance with aspects of the disclosure.
Figure 6B:
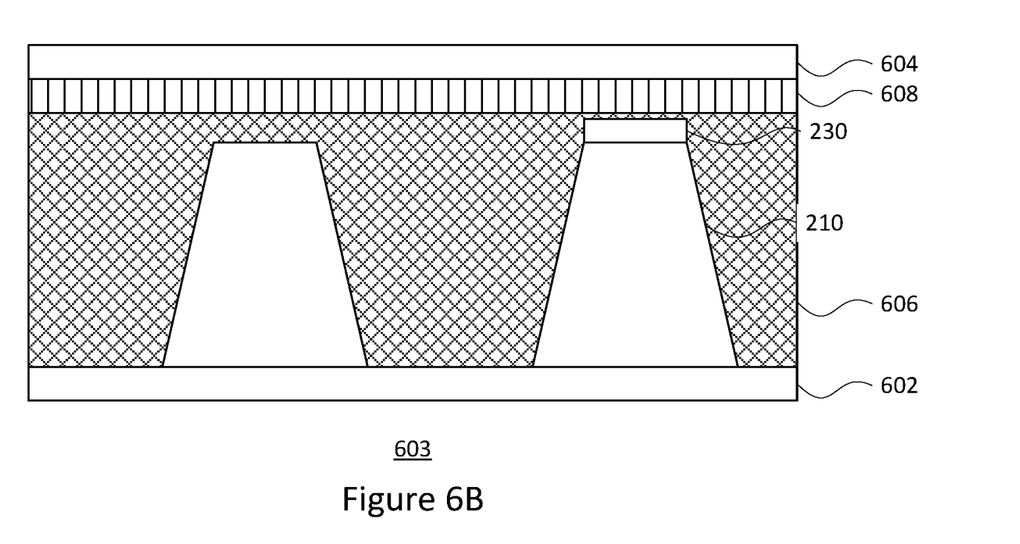

In further embodiments, a combination of materials may be used to create the energy absorbing layers. For example, as shown in FIGS. 6A and 6B, multiple layers of energy absorbing materials may be positioned between top layer 604 and bottom layer 602. In this regard, a first energy absorbing layer 606, comprised of polyurethane foam which is about 20 mm thick, may be positioned on top of the bottom layer 602. A second energy absorbing layer 608, comprised of aluminum honeycomb which is about 0.55 mm thick, may be positioned on top of the first energy absorbing layer 606.

The top layer 604 and bottom layer 602 of vehicle panels 601 and 603 may be comprised of steel with a thickness of about 0.35 mm Vehicle panel 601, of FIG. 6A, may not include any forms. Vehicle panel 603, of FIG. 6B may include cone forms 210 and adhesives 230 on the bottom layer 602. With the inclusion of the cone forms 210, the weight of the vehicle panel 603 may be about 11.12 kg. Vehicle panel 601, which does not include any cone forms, may weigh slightly less than panel 603. In some embodiments, other outer sheets may be used, such as bottom layers 202, 402, or 502, and top layers 204, 404, and 504. In other embodiments, no cone forms or cutouts may be present Variations to the arrangement of, and types of materials used for, the energy absorbing layers may be made to adjust the stiffness, torsional rigidity, and strength of vehicle panels. In this regard, the energy absorbing layers, such as, friable foams may be relatively stiff in static loading conditions, but soften during high energy impacts (e.g., a collision with the vehicle). Depending on the positioning and arrangement of the energy absorbing layers, an increase in the torsional rigidity and strength of the vehicle panel may occur. For example, baseline vehicle panel 201 which includes no energy absorbing may have a torsion constant of about 46 Nm/Deg. In contrast, vehicle panel 603 which includes cone forms 210 and two energy absorbing layers, a polyurethane foam 606 and aluminum honeycomb 608, may have a torsion constant of about 160 Nm/Deg. As such, vehicle panel 603 may have a torsional rigidity over 110% greater than the baseline vehicle panel 201. Vehicle panels 501 and 503, which include a single energy absorbing layer 506, made of polyurethane foam may have torsion constants of 65 Nm/Deg and 151 Nm/Deg, respectively. As such vehicle panels 501 and 503 may have torsional rigidities which are about 34% and 106% greater than that of the baseline vehicle panel 201.

Depending on the arrangement of the energy absorbing layers the gauge of the steel comprising the outer sheets of the vehicle panel may be increased, as substituting the empty space between the top and bottom layers with energy absorbing layers provides the vehicle panel with enough stiffness. Thus, the strength provided by the use of lower gauged steel may become more than needed. As such, a higher gauged (i.e., thinner) material may be used to create the top and bottom layers of the hood panel while maintaining the strength of the vehicle panel. For example, vehicle panels 501, 503, and 603 may all include higher gauged steel than baseline vehicle panel 201. However, the stiffness of the panels may be between about 1.4× and 2.5× stiffer than the baseline vehicle panel 201.

In some embodiments, the increase in the gauge of the material may result in weight savings of about 30%, or more or less, while still achieving the stiffness necessary for the panels to be used on a vehicle. The reduced weight may increase vehicle fuel efficiency of the vehicle. As previously discussed, baseline vehicle panel 201 may weigh about 15.65 kg. Vehicle panels 501, 503, and 603 may weigh 10.92 kg, 11.03 kg, and 11.12 kg, respectively. As such, by increasing the gauge of the material used for the outer sheets compared to baseline vehicle panel 201, vehicle panels 501, 503, and 603 have a reduce weight between about 4.73 kg and 4.53 kg.

The features of the vehicle panels described above may reduce the risk of injury or damage to persons or objects which may collide with the vehicle. In this regard, the energy absorption capabilities of the energy absorbing layers can potentially reduce injury or damage by absorbing more energy than a conventional panel. For example, configurations of a hood panel shown may result in a 24% reduction in head injury criterion measurements, such as the HIC15, over a baseline configuration, while still being 42% stiffer. This reduction in the HIC15 measurements may be further be tuned by using different material combinations for the outer sheets and the energy absorbing layers to achieve lower weight, while still maintaining relative stiffness to the baseline.

Additionally, the cost and complexity in manufacturing the panels may be reduced, as the use of energy absorbing layers may remove the need for additional materials to strengthen the torsional rigidity of the vehicle panels. In this regard, conventional panels may include additional forms welded or attached onto the panels for the purpose of strengthening the vehicle panels. These additional forms may require complex tooling, high amounts of laser weld areas, and more use of heavy materials, such as steel, etc. By strengthening the torsional rigidity of the panels with cheaper and lighter energy absorbing layers, the panels may not need the additional forms, thereby removing many of the complex and costly manufacturing requirements of conventional vehicle panels such as hood panels.

Figure 7A:
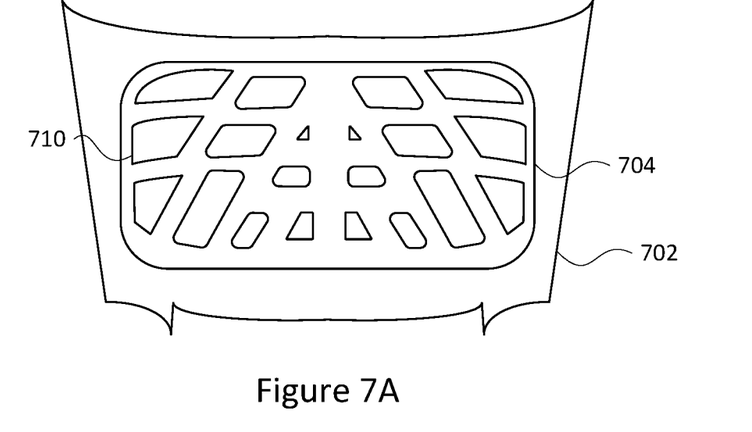
FIGS. 7A-C are example illustrations of panel sheets in accordance with aspects of the disclosure.
Figure 7B:
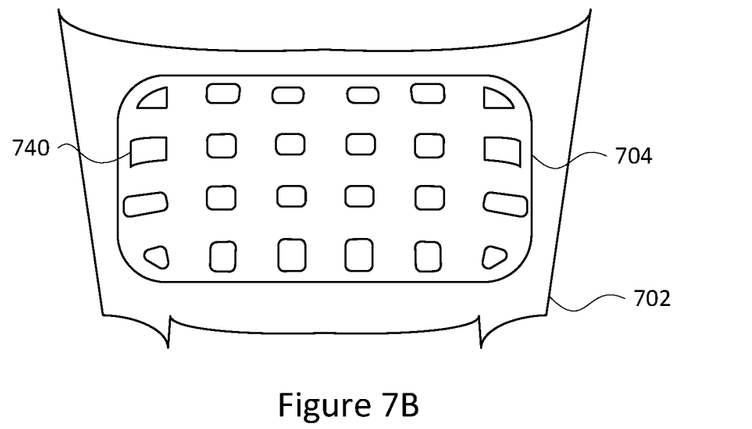
Figure 7C:
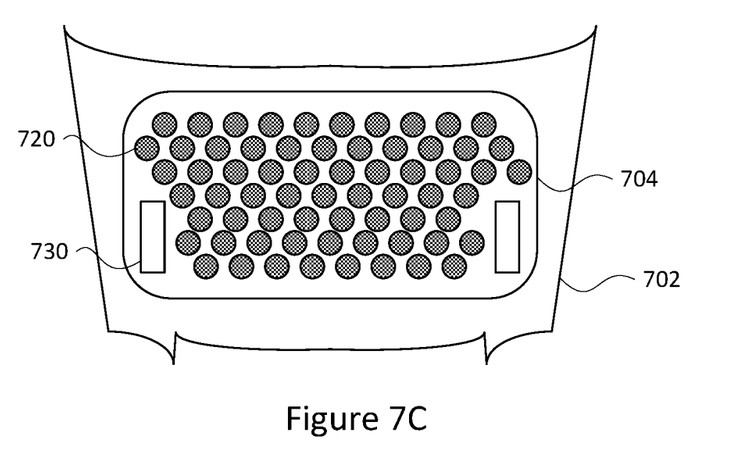

In some embodiments, other arrangements and types of forms may be used on the outer sheets. For example, as shown in FIGS. 7A-7C, bottom layer 702 may include different types and arrangements of forms and cutouts on the interior portion 704. Turning first to FIGS. 7A and 7B, the forms 720 and cutouts 710 and 740 of the material forming the bottom layer 702. The cutouts may be of various shapes and sizes. Although not shown, additional supports, such as thicker areas of the material, may be formed on the bottom layer 702, to increase the strength and torsional rigidity of the bottom layer. Turning now to FIG. 7C, the bottom layer 702 may include forms and cutouts, such as cutouts 730 in addition to cone forms 720. In some embodiments, the arrangements and type of forms shown in bottom layer 702 may be used in other outer sheets, such as such as bottom layers 202, 402, 502, and 602, and top layers 204, 404, 504, and 604.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding components do not have to be arranged in the precise order described above. Rather, various components can be arranged in a different order, such as reversed. Components can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A vehicle panel comprising:
a top layer including one or more cutouts; and
a bottom layer,
wherein the bottom layer is bonded to the top layer, and
wherein either the top layer or the bottom layer includes a plurality of individual forms attached to a surface of at least one of the top layer or the bottom layer and the plurality of individual forms are provided between the top and bottom layers.

2. The vehicle panel of claim 1, wherein the plurality of individual forms each have different sizes.

3. The vehicle panel of claim 1, wherein each of the individual forms comprises a square form or a rectangular form.

4. The vehicle panel of claim 1, wherein the one or more cutouts have different sizes.

5. The vehicle panel of claim 1, wherein the plurality of individual forms are each coated with an adhesive.

6. The vehicle of claim 5 wherein the plurality of individual forms coated with the adhesive bonds the top layer and bottom layer together.

7. The vehicle panel of claim 1, wherein the panel is a vehicle hood panel, bumper panel, door panel or nose panel.

8. A vehicle panel comprising:
a top layer including one or more cutouts;
a bottom layer, wherein the bottom layer is bonded to the top layer; and
at least one energy absorbing layer positioned between the top layer and the bottom layer,
wherein either the top layer or the bottom layer includes a plurality of individual forms attached to a surface of at least one of the top layer or the bottom layer and the plurality of individual forms are provided between the top and bottom layers.

9. The vehicle panel of claim 8, wherein the plurality of individual forms each have different sizes.

10. The vehicle panel of claim 8, wherein the plurality of individual forms are each coated with an adhesive.

11. The vehicle panel of claim 8, wherein the one or more cutouts have different sizes.

12. The vehicle panel of claim 8, wherein the panel is a vehicle hood panel, bumper panel, door panel or nose panel.

13. The vehicle panel of claim 8, wherein each of the individual forms comprises a square form or a rectangular form.

14. A vehicle panel comprising:
a top layer including one or more cutouts;
a bottom layer, wherein the bottom layer is bonded to the top layer; and
at least two energy absorbing layers formed of different materials positioned between the top layer and the bottom layer,
wherein either the top layer or the bottom layer includes a plurality of individual forms attached to a surface of at least one of the top layer or the bottom layer and the plurality of individual forms are provided between the top and bottom layers.

15. The vehicle panel of claim 14, wherein each of the individual forms comprises a square form or a rectangular form.

* * * * *